Figure 1:
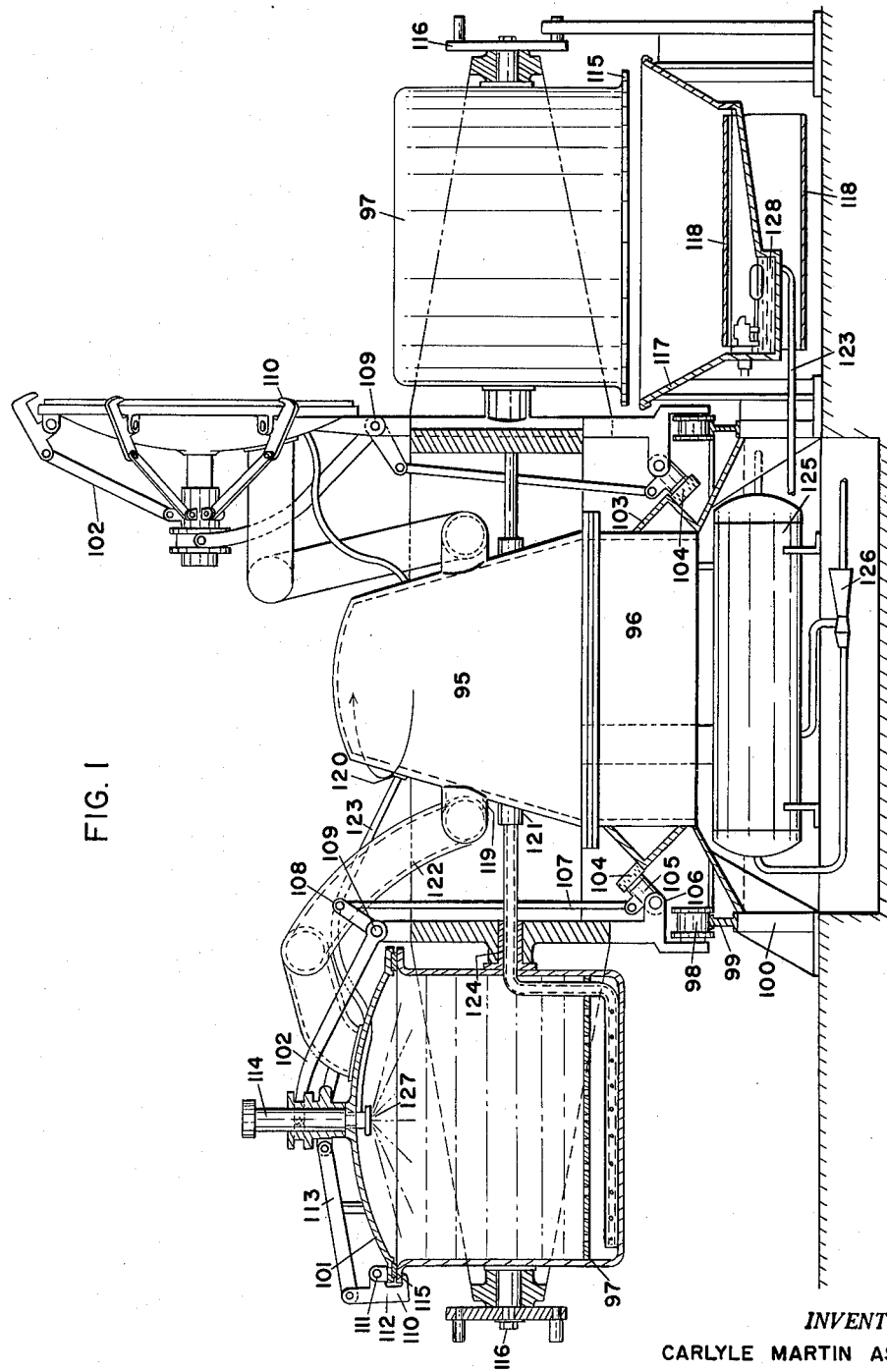

April 4, 1961 C. M. ASHLEY 2,978,325
METHOD OF BLANCHING FOOD PRODUCTS
Original Filed Nov. 14, 1951 2 Sheets-Sheet 1

FIG. I

INVENTOR.
CARLYLE MARTIN ASHLEY
BY
ATTORNEY.

April 4, 1961     C. M. ASHLEY     2,978,325
METHOD OF BLANCHING FOOD PRODUCTS
Original Filed Nov. 14, 1951     2 Sheets-Sheet 2

INVENTOR.
CARLYLE MARTIN ASHLEY
BY
ATTORNEY.

United States Patent Office 2,978,325
Patented Apr. 4, 1961

2,978,325
METHOD OF BLANCHING FOOD PRODUCTS

Carlyle Martin Ashley, Fayetteville, N.Y., assignor to Carrier Corporation, Syracuse, N.Y., a corporation of Delaware Original application Nov. 14, 1951, Ser. No. 256,315, now Patent No. 2,870,020, dated Jan. 20, 1959. Divided and this application June 2, 1958, Ser. No. 739,142

1 Claim. (Cl. 99—1)

This application is a division of copending application, Serial No. 256,315, filed November 14, 1951, entitled "Method and Apparatus for Blanching Food Products," now Patent No. 2,870,020. This invention relates to a method of blanching or scalding and subsequent cooling of food products and equipment therefor and, more particularly, to a method of steam blanching food products in which dissolved solids are returned to the food product preferably during the cooling operation and to apparatus for steam blanching food products, collecting dissolved solids, and returning the dissolved solids to the food product during the cooling operation.

In food freezing, either domestic or commercial, it is essential to blanch or scald the food product, particularly vegetables, before the freezing operation to destroy or render inactive the enzymes to prevent the appearance and taste of the frozen product being deleteriously affected. While blanching is conducted to destroy the principal enzymes, overblanching should be avoided.

Blanching has generally been conducted by means of boiling water or steam. Water blanching is not satisfactory for it results in a decrease in the nutritive value of the food product since a large proportion of the juices and dissolved solids such as vitamins and minerals are washed away. It may result in a relative loss in weight in the final product which is extremely serious in commercial applications since the product is sold by weight. The water supply too may affect the texture, appearance, odor, flavor, nutritive value or storage life of the product since it may contain materials injurious to any or all of such factors; to avoid damage to the food product from the water supply, it is customary in larger freezing plants to provide expensive water treatment equipment.

In the steam blanching processes as heretofore conducted, the solids dissolved in the condensate are not returned to the product but are wasted. A further disadvantage rests in the fact that in the processes used heretofore the product is washed with water when it is in a soft, porous condition to cool the same with resulting loss of a considerable additional percentage of solids.

The chief object of the present invention is to eliminate the present disadvantages of steam blanching and water cooling.

An object of the present invention is to provide a method of steam blanching in which nutrients are returned to the food product prior to freezing. The term "nutrients" is used herein to designate dissolved solids such as minerals, vitamins, proteins, carbohydrates, etc.

A further object is to provide a method of steam blanching in which nutrients are returned to the food product during the cooling operation.

A still further object is to provide a method of steam blanching and cooling in which condensate and juices given off by the food product during the steaming operation are evaporated under vacuum while in contact with the food product to cool the same, to restore the original weight and to return the dissolved solids to the food product.

A still further object is to provide a method of blanching in which steam is introduced and air and other noncondensible gases are removed in such manner that a minimum of oxygen is in contact with the heated food product to cause oxidation.

A still further object is to prevent the reintroduction of bacteria to the heat-sterilized food product by contact with non-sterile water.

A still further object is to provide apparatus for steam blanching and subsequent cooling of food products adapted for commercial use.

A still further object is to provide blanching apparatus in which condensate is removed from the food product at the end of the heating operation.

A still further object is to provide apparatus to blanch a food product and to cool the same while returning dissolved solids and juices thereto to restore its original weight, flavor and appearance. Other objects of the invention will be readily perceived from the following description.

This invention relates to a method of blanching and cooling food products in which the steps consist in placing a heated vapor in contact with the food product to heat the same, collecting nutrients given off by the food product during the heating operation, cooling the heated food product and distributing the collected nutrients over the food product to restore substantially the original nutrients, including vitamins and minerals.

This invention further relates to a method of blanching and cooling food products in which the steps consist in circulating a heated vapor over a food product to heat the same while condensing at least a portion of the vapor upon the product, discontinuing the supply of heated vapor, and then creating a vacuum about the food product to evaporate liquid present on the surface of the food product to cool the same.

This invention further relates to apparatus for blanching and cooling food products which comprises, in combination, means for supplying a heated vapor over the food product to heat the same thereby condensing at least a portion of the vapor, means for collecting at least a portion of the nutrients given off by the food product when it is contacted by the vapor, and means for distributing at least a portion of the collected nutrients over the food product to restore a substantial portion of the original nutrient content.

Figure 2:
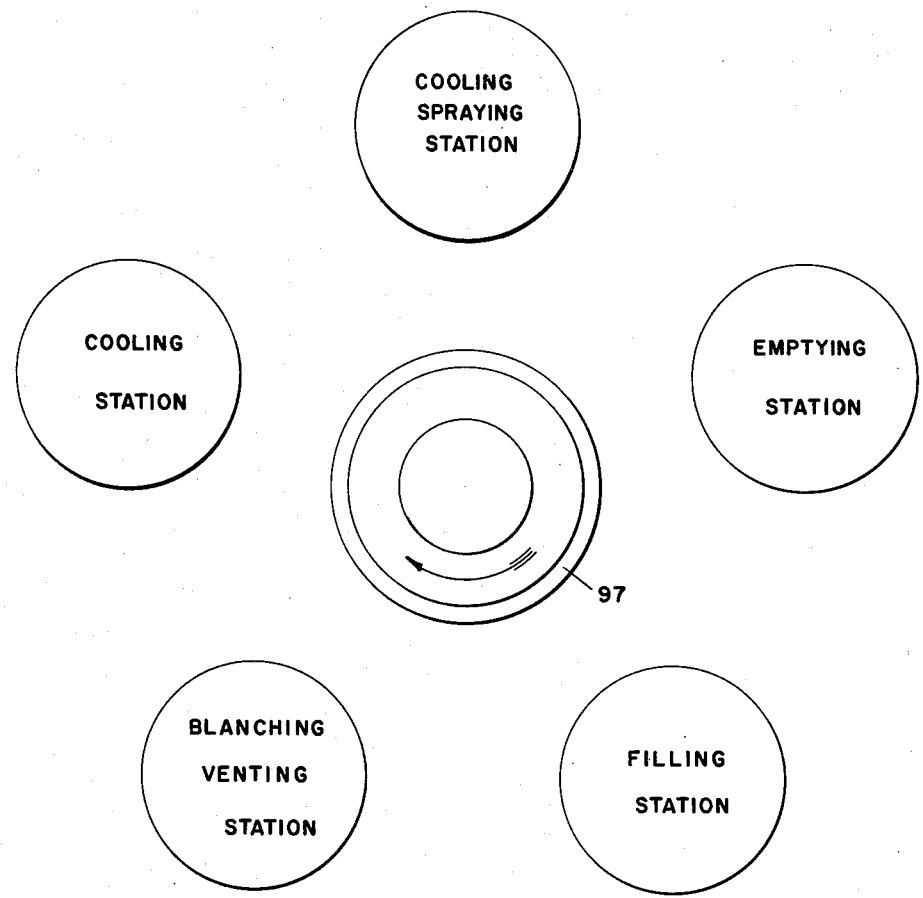

The attached drawings illustrate preferred embodiments of the invention, in which Figure 1 is a view partly in section and partly in elevation of a portion of a continuous blanching and cooling device for commercial use; and Figure 2 is a diagrammatic view illustrating the various stations of the device shown in Figure 1.

The device shown in Figures 1 and 2 is adapted for commercial blanching conducted as a continuous operation. The device comprises a rotatable control member 95 mounted on a base 96 and carrying a plurality of vessels 97 to receive food products. Vessels 97 are mounted on rollers 98 running on a track 99 supported by the framework 100 of the device. Any suitable means (not shown) may be provided to rotate the vessels continuously or step-by-step about the central member.

Each vessel 97 is provided with a cover 101 which may be raised or lowered and locked in place on the vessel by suitable lifting and locking mechanism 102 actuated by means of a cam member 103. Mechanism 102 includes a cam follower 104 mounted on an arm 105 pivoted at 106 and attached to a rod 107. Rod 107 is connected at the opposite end to a second arm 108 pivoted at 109. Hook or finger members 110 are pivoted at 111 on cover 101 and are connected by links 112, 113 to a central post 114. Thus, as cam member 103 moves follower 104 downward, arm 105 pivots about point 106 moving rod 107 downward. Downward movement of rod 107 pivots arm 108 about pivot point 109 tending to raise cover 101 and to release fingers 110 clamping the cover to flange 115 on vessel 97.

Suitable mechanism shown at 116 is provided to tilt vessels 97 to empty their contents into a chute 117 leading to a continuous screen conveyor 118.

Central member 95 contains ports 119, 120, 121 connected to vessels 97 by flexible connections 122, 123, 124 for steam, condensate and as a purge line. Within member 95 are ported plates (not shown) connected by ducts (not shown) to the ports 119, 120, 121. Depending upon the station at which any vessel 97 is positioned, steam is supplied and the vessel is purged or a vacuum is drawn in the vessel and condensate is sprayed over the food product within the vessel. It will be appreciated each of these operations is performed automatically by the rotation of the central member and vessels.

A condenser 125 is provided to reduce the pressure in the vessel to permit the cooling operation to be conducted, being conencted through connection 122 to the vessel in accordance with the rotation of the central member. The usual water ejector 126 is connected to the condenser 125 to purge non-condensible gases therefrom.

Cooling of the food product is accomplished by employing the condenser 125 to reduce pressure in the vessel thereby evaporating liquid present on the surfaces of the food product therein. Rewetting the food product may be accomplished by spray nozzles 127 in the top of vessel 97 which distribute condensate over the surfaces of the products, the nozzles being connected to a supply of condensate by connection 123 as shown.

Food product is suplied to each vessel by means of a belt (not shown) which feeds the product to a tray (not shown) which may be tilted periodically by the motion of the rotating central member 95 to supply the food product to vessels 97. At a second station about the apparatus, the blanching and venting operations are performed. The cooling operation is conducted at a third station. At a fourth station the cooling operation is continued while condensate is sprayed over the food product in the vessel. At a fifth station the food product is emptied from the vessel on the second conveyor belt or screen 118, condensate flowing through the screen and being collected in a pan or sump 128, condensate collected in pan 128 being delivered by the difference in pressure between atmosphere and vacuum over the surfaces of the food product in a succeeding vessel or, if desired, it may be sprayed over the surface of the food product on belt 118.

Nozzles 127 are connected by line 123 to condensate supply (sump 128, for example) in order to rewet the food product in the vessels 97 during the cooling operation.

Considering the operation of the device, a food product is supplied to a vessel 97 at a first station. When the vessel moves to a second station steam is admitted to vessel 97 through connection 122. Simultaneously, air and non-condensible gases are vented from the bottom of vessel 97 through purge line 124. The steam heats the food product in the vessel, some portion of the steam vapor condensing thereon. Condensate flows to the bottom of the vessel. Any excess of condensate may be drawn off through a drain valve (not shown) for reuse during succeeding cooling cycles. At a third station, supply of steam to vessel 97 is discontinued and pressure is decreased in the vessel by means of condenser 125 thereby evaporating condensate to cool the food product. Vapor from the food product, together with any non-condensible gases remaining in vessel 97, is drawn into condenser 125. Removal of the vapor from vessel 97 lowers the pressure therein, thus evaporating condensate collected on the surfaces of the food product to cool the same. A foam breaker may be employed as previously described; if desired the nozzle sprays may be utilized to break any foam. Condensate, including juices and nutrients from previous batches, if desired, is then sprayed over the food product in the vessel at a fourth station, the cooling operation continuing, to rewet the food product thereby recovering juices and water lost during the cooling operation and restoring the original weight or a greater weight as previously described. Sufficient condensate may be sprayed at the end of the operation to submerge the food product in vessel 97, thus assuring a maximum gain in weight. It will be appreciated the weight of the food product may be decreased slightly if desired or may be increased appreciably as desirable in commercial blanching.

Thereafter, at a fifth station, the vacuum in vessel 97 is broken. The cover 101 is released and raised automatically by mechanism 102 and the vessel is tilted by mechanism 116 permitting the food product to drop therefrom onto continuous belt 118.

If desired, an inner perforated metal container for the food product may be employed. If such container be employed, the container is raised and inverted, rather than the vessel itself, to remove the food product from the vessel. Likewise, a hinged bottom may be provided for the vessel to permit the food product to be dropped upon the belt.

The present invention provides a simple, ready, economical method of blanching food products and cooling the same which may be practiced in commercial blanching operations. The method provided by my invention assures that juices and dissolved solids are returned to the food product before freezing and restores substantially the intial weight of the product, which is of particular value in commercial operations. The device may be employed to practice the invention as a domestic procedure and may be employed to practice the invention as a continuous process or as a batch process in commercial operation.

It will be appreciated if the food product is heated through the same range as it is cooled, substantially no change in weight of the food product will occur. The food will absorb substantailly all of the juices since heating followed by cooling increases the absorptive capacity.

While I have described a preferred embodiment of the invention, it will be understood the invention is not limited thereto since it may be otherwise embodied within the scope of the following claim.

I claim:

In a method of continuously blanching food products, the steps which consist in placing steam in contact with the food product in a vessel to heat the same and condensing a portion of the steam thereon at a first station, discontinuing the supply of steam, collecting the condensate and nutrients from the food product reducing the pressure about the food product at a second station to evaporate liquid present on the surface of the food product to cool the same, continuing the cooling operation while spraying condensate and nutrients over the surfaces of the food product at a third station to return a substantial part of the condensate and nutrients to the food product and removing the food product from the vessel at a fourth station while collecing condensate and nutrients remaining in the vessel for supply to a food product at the third station.

References Cited in the file of this patent

UNITED STATES PATENTS

| | | |
|---|---|---|
| 2,373,521 | Wigelsworth | Apr. 10, 1945 |
| 2,403,871 | McBean | July 9, 1946 |
| 2,418,519 | McBeth | Apr. 8, 1947 |
| 2,515,879 | Korn | July 18, 1950 |
| 2,522,513 | Hemmeter | Sept. 19, 1950 |
| 2,581,484 | Helgerud | Jan. 8, 1952 |
| 2,692,200 | Olson | Oct. 19, 1954 |
| 2,870,020 | Ashley | Jan. 20, 1959 |